United States Patent [19]
Kuhn et al.

[11] 4,354,173
[45] Oct. 12, 1982

[54] ARRANGEMENT FOR OBTAINING AN INDICATION OF EFFICIENCY OF OPERATION OF A MOTOR VEHICLE

[75] Inventors: Peter Kuhn, Villingen-Schwenningen; Max Kolar, Aalen; Robert Weber, Brigachtal; Siegfried Koch, Villingen-Schwenningen, all of Fed. Rep. of Germany

[73] Assignee: Kienzle Apparate GmbH, Villingen, Fed. Rep. of Germany

[21] Appl. No.: 166,796

[22] Filed: Jul. 8, 1980

[30] Foreign Application Priority Data

Jul. 13, 1979 [DE] Fed. Rep. of Germany ........ 2928318

[51] Int. Cl.³ .............................................. G08B 19/00
[52] U.S. Cl. ................................ 340/52 F; 340/52 D; 340/52 R
[58] Field of Search ................. 340/52 R, 52 D, 52 F, 340/669, 670

[56] References Cited

U.S. PATENT DOCUMENTS

| | | | |
|---|---|---|---|
| 3,988,730 | 10/1976 | Valker | 340/52 F |
| 4,136,329 | 1/1979 | Trobert | 340/52 F |
| 4,188,618 | 2/1980 | Weisbart | 340/52 F |

*Primary Examiner*—Alvin H. Waring
*Attorney, Agent, or Firm*—Toren, McGeady & Stanger

[57] ABSTRACT

An arrangement which provides an indication of the economy of motor vehicle operation includes a number of sensors for detecting different vehicle operating factors including engine speed, distances travelled by the vehicle, and the position of the engine throttle. An acceleration measuring device is coupled to the distance sensor to determine the vehicle acceleration. Circuitry coupled to the sensors including the acceleration measuring device provides operating condition values in the form of code word elements. This circuitry includes a first comparator for setting a first set of threshold values so that the code word elements provided by the first comparator each correspond to a certain engine speed range. The circuitry also includes a second comparator operative to set a second set of threshold values so that the code word elements provided by the second comparator each correspond to a certain acceleration range. Likewise, the third sensor operates to provide code word elements each of which corresponds to a particular range of positions of the engine throttle. A matrix combines all the code word elements into a combined code word which is then evaluated and accorded a particular rating. At least one signal transmitter is provided for alerting the vehicle operator when the rating of the combined code word is such as to call for a change of operating behavior, e.g., a shift of gears.

5 Claims, 3 Drawing Figures

FIG. 1

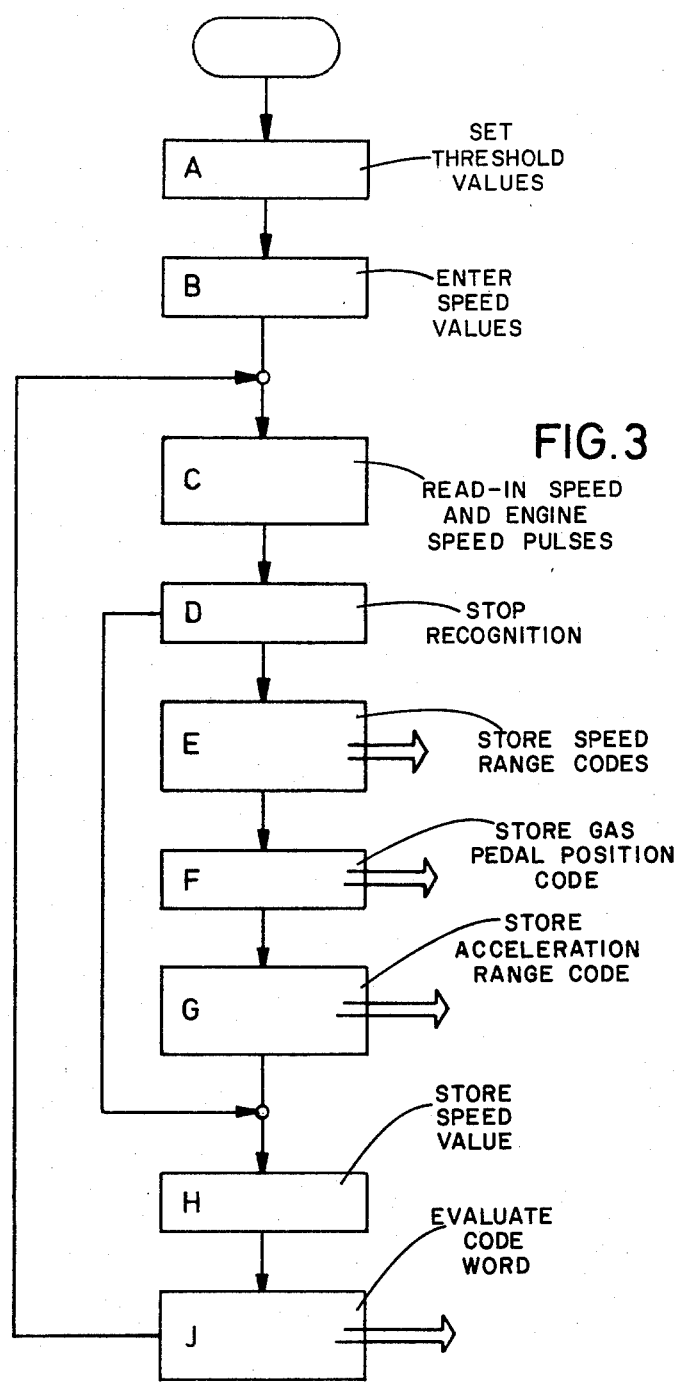

ARRANGEMENT FOR OBTAINING AN INDICATION OF EFFICIENCY OF OPERATION OF A MOTOR VEHICLE

BACKGROUND OF THE INVENTION

The invention relates to an arrangement for obtaining an indication concerning an economical and/or uneconomical operation of a motor vehicle, with the use of a plurality of pick-ups or sensors which detect various operating factors, means for measuring and/or merely transmitting the detected operating factors to a device for the formation of values which characterize operating conditions, and means for indications of results of an evaluation of the formed operating condition values with the aid of a predetermined evaluation pattern.

When speaking of economical operation of a motor vehicle, particularly a truck or bus, this term generally relates today to the concept of performing a certain transportation task with the lowest possible, or in better words, only with the absolutely necessary, fuel requirement.

Of course, "absolutely necessary" refers to that fuel requirement which, aside from grave driving mistakes, results from a reasonable driving behavior, i.e. joining the flowing traffic and observing the recommended speeds, if the geographic conditions permit. For example, if a fully loaded truck has to climb a grade, this driving situation cannot generally be considered uneconomical because, in this case, an increased fuel requirement results not only from the driving of a distance but also from the inevitably required lifting work, and this requirement must be met for fulfilling the transportation task. It is essential that in these cases the driving behavior be adjusted to the principle of "absolutely necessary" which may make it necessary, for example, to shift and always to shift at the right time, or even to depress the gas pedal in certain cases.

Exceptions which require a correction of this basic evaluation of the "absolutely necessary" fuel requirement exist, for example, when relatively narrow time limits are set in the transportation of perishable goods or when the delivery and pick-up times or timetables of other means of transportation must be adhered to.

As is well known, in the past, it has been attempted to solve the problem of providing an indication of economical and/or uneconomical operation of a motor vehicle exclusively by measuring the momentary fuel consumption, i.e., by measuring the fuel amount consumed per distance or time unit or also, with the appropriate conversion, the distance which can be travelled per unit of amount of fuel. For this purpose, a plurality of direct and indirect measuring methods have become known, requiring, in part, highly complicated measuring techniques. It is further known to determine the absolute amounts of fuel consumed by counting and, if necessary, recording them and to use them later for the evaluation, for example, of the travel diagrams of tachographs, or for an economic evaluation for the determination of the costs related to a task. However, also in this method, highly complicated devices must be used if the errors of measurement are to be kept within reasonable limits, particularly because of the temperature variation which is inevitable in the operation of motor vehicles.

On the other hand, a momentary value indication of fuel consumption, which need not necessarily be based on a highly accurate flow measurement and which can be designed as an indication of a trend, offers the possibility to the driver to change his driving behavior in accordance with this indication. However, the driver is not relieved of having to interpret the indication for a given driving situation. Accordingly, aside from the fact that this indication is relatively unsteady and that damping measures must be provided, this indication leads to purely subjective changes of driving behavior which are made by feeling, as well as to a certain insecurity of the driver if, on the one hand, he seeks consistently to minimize the fuel requirement, and, on the other hand, he must adhere to recommended speeds and join the flowing traffic as much as possible in order not to become an obstacle. Moreover, an increase particularly of measuring devices in the motor vehicle indicating the momentary values which require a relatively long time to read and, thus, take the driver's attention from the traffic, leads to an increase of the safety risk. Accordingly, such a device will be ignored by a skilled driver because it is not useful in practice and, therefore, the device is meaningless.

A more accurate evaluation of the momentary operating condition of a motor vehicle than that possible by a mere indication of the fuel consumption can be achieved, for example, by means of an arrangement which has become known from German Offenlegungsschrift No. 2,357,770. This arrangement provides for an additional pointer which is coaxially arranged with the pointer of a speedometer and which is in operative gear connection with the gas pedal, so that the relation between the fuel supply controlled by the gas pedal and the momentary vehicle speed can be recognized. This combination of indications makes it possible to estimate whether it is possible by means of shifting to adjust the driving manner to a more advantageous fuel consumption/speed ratio. However, this combination must initially be directly interpreted by the driver. The above-mentioned reference only contains hints or suggestions for interpretation and, aside from the fact that no additional value which can be further processed is formed, cannot do justice to most of the critical operating conditions which occur in practical operation and often appear only to be uneconomical.

German Offenlegungsschrift No. 27 31 568, on the other hand, shows arrangement for the formation of an at least a qualitative indication concerning the momentary fuel consumption, wherein the throttle valve position and the speed threshold values are joined by means of a potentiometer in such a way that distinguishable indications of the fuel consumption can be obtained for the operation of a motor vehicle under load, when the vehicle overruns the engine, and during idling. Accordingly, this arrangement offers an actually obvious indication concerning the economical or uneconomical operation only with respect to the two conditions "idling" and "vehicle overrunning engine", and is just as unsuitable for the desired purpose, i.e. an indication concerning the economy of the driving condition, as the other known measuring devices for fuel consumption.

Another arrangement which has become known from German Offenlegungsschrift No. 28 07 604 essentially concerns the joining and indication of the operating factors "fuel consumption" and "acceleration," wherein the respective fuel consumption/acceleration ratio is indicated by means of a light-emitting diode matrix in the form of a light spot. Since, similarly to the first-mentioned German Offenlegungsschrift No. 23 57 770, the operating factors to be processed are either equal or equivalent, the essential operating conditions of a motor vehicle can only be insufficiently indicated by means of this arrangement. Therefore, the interpretation of the indication which, also in this case, is left to the driver, can lead to a completely incorrect adjustment of his driving manner. Aside from the requirements concerning the indicating means and the measuring device for the fuel consumption, the arrangement according to German Offenlegungsschrift 28 07 604 requires a significant observation effort of the driver, especially since the indication continuously changes during travel and, in many cases, the indication changes so quickly that a reaction of the driver to the indication is not even possible.

Since, accordingly, a mere indication of the fuel consumption, or also the combined indications from the state of the art, for evaluating the momentary operating condition of a motor vehicle, are either not suitable or only suitable to a limited extent, it is the task of the present invention to provide an arrangement which avoids the deficiencies of the already known solutions and, with the use of uncomplicated, yet distinctive measuring techniques, allows an indication which, on the one hand, offers an indication without interpretation concerning the economical and/or uneconomical operation of a motor vehicle, or at least signals severely uneconomical operating conditions, and, on the other hand, requires a minimum of attention by the driver for observation.

The solution of this task in accordance with the invention starts from the finding that momentary fuel consumption is not necessarily the decisive operating factor for indication concerning an economical or uneconomical operation of a motor vehicle, but that, on the contrary, the engine speed, which can be measured with much simpler means, provides an equivalent indication, at least as far as the actual operating condition of the engine is concerned. Furthermore, this indication is to be supplemented by the indication of another operating factor characterizing the condition of movement of the vehicle, for example, the acceleration or deceleration, so that also the physical factors influencing the condition of movement of the vehicle through geographic conditions, load and wind, are taken into consideration. In order to also take into consideration the subjective influence of the driver, it is necessary to also consider the momentary position of the gas pedal or an operating factor equivalent to the gas pedal position.

Consequently, the solution in accordance with the invention is characterized in that pick-ups or sensors are provided at least for detecting the speed of the engine, the distances travelled by the vehicle, and for detecting various gas pedal positions. A first comparator comprising means for selectively fixing threshold values is provided whose inputs are connected to the outputs of a speed measuring device assigned to the engine speed pick-up, and at whose outputs signals can be made available which, in accordance with the measured speed, characterize a speed range determined by the threshold values. A second comparator also comprising means for selectively fixing threshold values is provided whose inputs are connected to the outputs of an acceleration measuring device assigned to the distance pick-up and at whose outputs signals can be made available which, in accordance with the measured acceleration, characterize a certain acceleration range determined by the threshold values, but at least the ranges $-\Delta b/O/+\Delta b, > +\Delta b$ and $> -\Delta b$. A matrix is formed in which the outputs of the first comparator, those of the second comparator, and the outputs of a gas pedal position pick-up are linked or encoded together in such a way that each is combined with all others, and that to the matrix there is connected at least one signal transmitter which provides a plurality of signal conditions of which a different one is assigned to each group of combined matrix outputs of equal ratings.

An embodiment of the invention provides that processing of the operating factors provided by the pick-ups is effected with the use of a microprocessor in such a way that a code word element characterizing the respective speed range is formed for each determined speed value, that a code word element characterizing the respective acceleration range is formed for each determined acceleration value, that, in addition, a code word element is formed for the respective position range of the gas pedal, and that the formed code word elements are OR'd in a working storage of the microprocessor to form a code word which generates an appropriate signal after further processing, with the content determined in accordance with the evaluation by a program stored in the arithmetic unit of the microprocessor.

Another embodiment of the invention provides that a plurality of indicating lights with different color representations are provided as signal transmitters, and/or that the signalling is effected in the form of verbal commands (e.g. shift gears, depress gas pedal), and that, simultaneously with the signalling, recording means including a tachograph are triggered.

Aside from the fact that, compared to the state of the art, only the arrangement in accordance with the invention in connection with the operating factors selected to be processed provides a pertinent indication which is specific for the operation. The invention, by means of the exclusive processing of operating factor ranges determined by threshold values, offers the advantage that relatively coarse tolerances are permissible at the pick-ups, i.e. at the points of detection of the operating factors. Moreover, the expenditure for the desired indication is kept low because of the finding that, for characterizing at least grossly uneconomical manners of driving, it is sufficient to determine only a few threshold values with a low number of operating factors. It is further advantageous that the pick-ups already provided in a truck or bus can be utilized for detecting the motor speeds and the distances travelled and only the position pick-ups required for the gas pedal or control rod must be provided. Therefore, a complicated measurement of the fuel consumption is avoided in all cases. Additionally, it is a special advantage in the driving routine that the driver is informed, for example, by signals of different colors, whether his driving manner is to be evaluated good or poor, possibly only conditionally satisfactory, and that these signals are possibly supplemented by verbal commands, such as, "depress gas pedal" or "shift gears". Signals of this kind do not require an interpretation and are easy to observe by the driver.

A special advantage is further provided in that, by "shifting" the threshold values, i.e. by enlarging or narrowing the operating factor ranges, it becomes possible in a relatively simple manner to obtain an evaluation which is specific for the vehicle, i.e. an adjustment of the evaluation pattern to the gear unit and the mechanical equipment of the respective vehicle. If necessary, the indication made possible by the three selected operating factors can be improved by a further division or by adding additional operating factors and, if applicable, the indication can be evaluated with different evaluation patterns.

Accordingly, the display of an evaluation of the operating conditions specific for the vehicle is important for the desired indication, and not the display of operating conditions as such, assuming that the latter have really been formed in a characterizing manner. Moreover, a skilled driver knows the operating conditions of his vehicle rather well; therefore, he does not require an indication of the individual conditions. However, the display of the evaluation of all the operating conditions enables him to take clear measures for maintaining or creating an economical manner of driving.

Of course, certain limit conditions must be set up in order to provide clear combinations corresponding to respective driving or operating conditions, and particularly for facilitating a meaningful evaluation for normal truck or bus operation. This includes the provision that an appropriate free area is ensured to the driver with respect to his driving manner. For example, it shall be predetermined that the lower range of the engine speed to be considered the control factor, i.e. the idling speed range, should not enter into the evaluation and, thus, a display should always only be effected during "travel" and a speed range of, for example, up to 60% of the rated speed of the engine is to be considered the optimum. In this connection, it is assumed initially that the skilled driver is well aware that the condition of idle operation is uneconomical with respect to the transportation task, but that he is forced to accept this condition at traffic lights and railroad gates. Another speed threshold value could then be predetermined, for example, at 85% of the rated speed. Furthermore, the optimum driving condition should be considered that driving condition during which the driving behavior of the vehicle can be characterized as "slightly drawing" with respect to the most favorable speed range. It must also be assumed initially that the driver is skilled and knows that he must shift into a lower gear if, for example, no more acceleration is possible by depressing the gas pedal and, consequently, the operating condition of the vehicle can no longer be called "slightly drawing."

BRIEF DESCRIPTION OF THE DRAWING

In the drawing:

FIG. 1 is a truth table showing a number of vehicle operating factors and evaluations of the factors according to the invention;

FIG. 3 is a flow chart showing process steps performed by a microprocessor which can be used in the embodiment of FIG. 2.

DETAILED DESCRIPTION OF THE INVENTION

Figure 1:
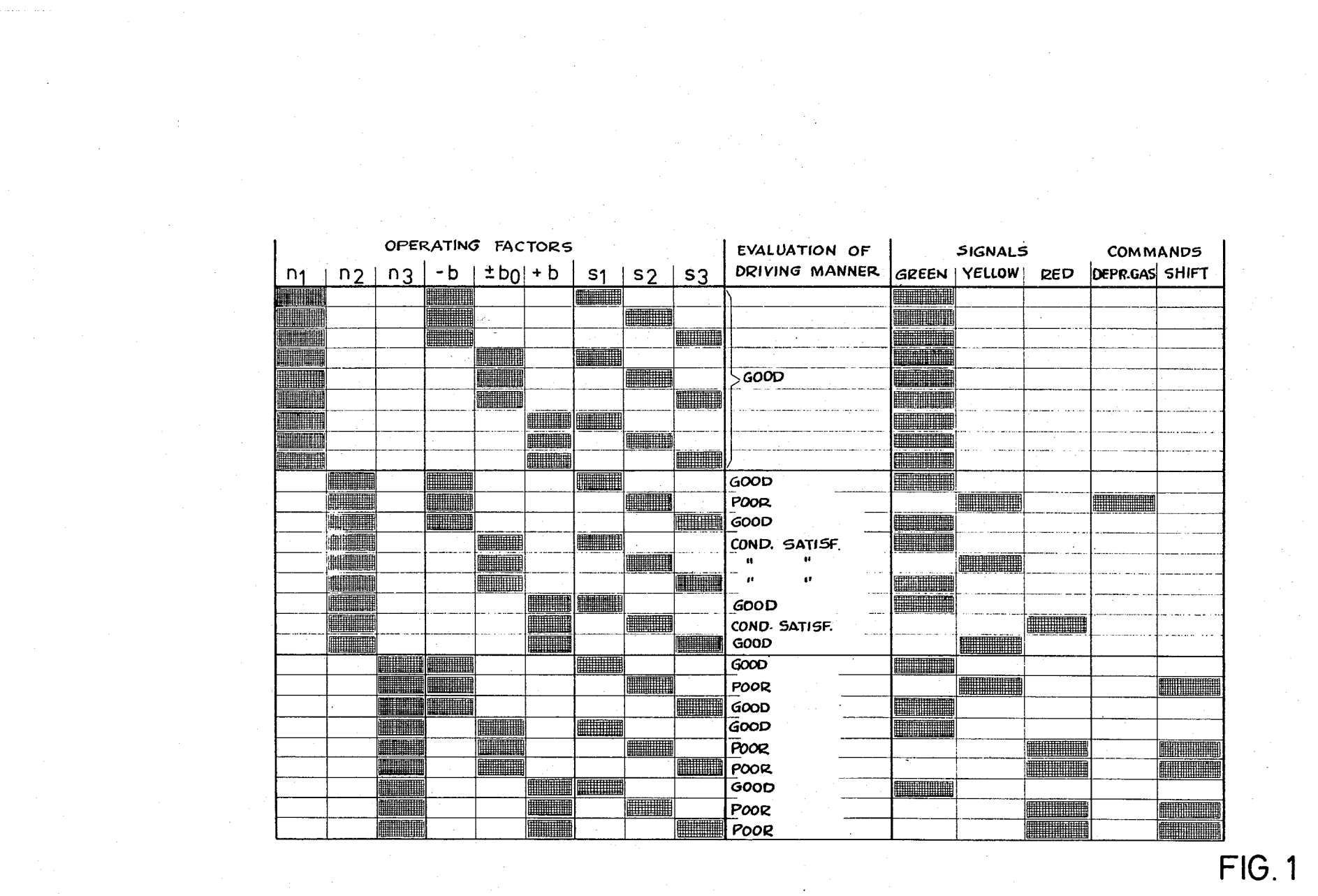
Figure 2:
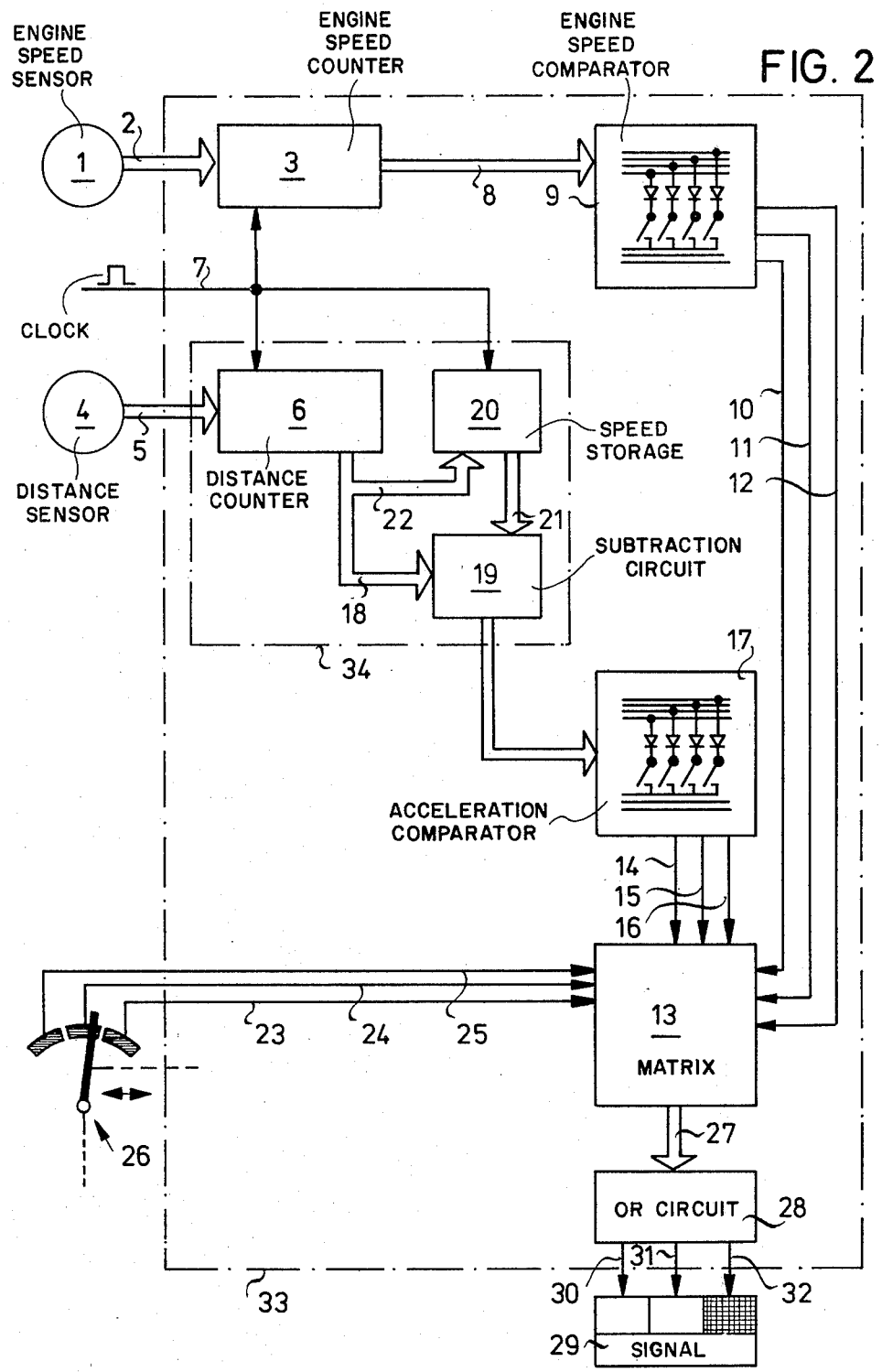
FIG. 2 is an electrical block diagram of an embodiment of the invention.

In columns $n_1$, $n_2$ and $n_3$ of the truth table of FIG. 1, the speed ranges selected for a certain type of vehicle are listed. $n_1$ shall indicate the already-mentioned speed range between the idling speed and about 60% of the rated speed of an engine, $n_2$ shall indicate the speed range between the 60% threshold value and the threshold value predetermined, for example, at 85% of the rated speed, and $n_3$ shall indicate the adjacent speed range up to the maximum engine speed. The following columns of the truth table are each assigned to acceleration ranges, wherein $\pm b_O$ characterizes a range which is defined by a deceleration threshold value $-\Delta b$ and an acceleration threshold value $+\Delta b$, which values can be predetermined specifically for a vehicle, for example, in the order of magnitude of 0.5 m/sec.$^2$, while $-b$ shall denote deceleration values of more than $-\Delta b$, and $+b$ shall denote acceleration values of more than $+\Delta b$. Furthermore $s_1$, $s_2$ and $s_3$ denote actuation ranges of switches assigned to the gas pedal or to the control rod of an injection machine. It can be determined, for example, that the threshold value between $s_1$ and $s_2$ shall be adjusted at 10% of the full acceleration position, and the threshold value between $s_2$ and $s_3$ shall be adjusted at 60% of the full acceleration position.

The next following column shows an evaluation of the operating factor combination resulting for each line of the table and, thus, the operating conditions which can be detected by means of the prepared truth table. The following columns concern the signals resulting from this evaluation, for example, in the form of light signals of different colors—acoustical signals are also conceivable for especially critical operating conditions—and, if necessary, verbal commands.

When a vehicle is started, the operating condition $n_1$, $+b$, $s_3$ will result with an initially flat roadway, i.e. the driver will increase the engine speed by depressing the gas pedal and will attempt to accelerate the vehicle in order to reach a speed which is either prescribed or considered appropriate by the driver. If the driver continues to press the gas pedal, the above operating condition, with a high likelihood, will change over into the operating condition $n_2$, $+b$, $s_3$. Simultaneously, the previous "good" display changes into a "conditionally satisfactory" display, i.e., it is assumed that the new operating condition now approaches an uneconomical condition and that the desired speed may not necessarily be reached in the shortest possible time, to wit, the speed could possibly also be reached by easing up on the gas pedal with less acceleration and by shifting into a higher gear at the correct time, so that the engine would operate in the most favorable speed range $n_1$ and, for example, an operating condition $n_1$, $\pm b_O$, $s_2$ would be adjusted after reaching the desired speed—if this is still possible with the maximum engine speed in the range $n_1$.

If the driver continues to drive "with full acceleration" and the engine speed has reached the range $n_3$, i.e. the operating condition $n_3$, $+b$, $s_3$ has been reached, the driver is signalled that he should change his driving manner through a "poor" display. If he eases up on the gas pedal, he will be additionally signalled "to shift into a higher gear" in the condition $n_3$, $b_2$, $s_2$. However, it is also possible that the vehicle does not reach this operating condition, but that the operating conditions $n_3$, $\pm b_O$, $s_2$ or $s_3$ have been already reached earlier, in which case, in addition to a "poor" display, "shift gears" will be signalled to the driver.

If a shift into a higher gear has been made, the engine speed will jump down to a lower value, e.g., $n_1$, and an operating condition $n_1$, $\pm b_O$, $s_2$ will be reached. In order to gain more speed, the driver, as described above, can again accelerate in a relatively uneconomical manner, in which case he would again be requested to shift into a higher gear, or he attempts to stay with a moderate acceleration and to shift earlier and, therefore, without being requested and—as already described—to maintain the optimum speed range $n_1$. Experience has shown that the latter behavior corresponds to the generally common driving manner of an experienced driver.

If the vehicle reaches a downward grade, the driver will release the gas pedal, but the speed of the engine may still climb to $n_2$ or $n_3$. In this case, also those operating conditions must be evaluated "good" in which the vehicle is accelerating, i.e., for example, the operating conditions $n_2$, $+b$, $s_1$ or $n_3$, $+b$, $s_1$—in this operating condition, it could be advantageous to give an "excess speed signal"—because the fuel consumption is minimal, i.e. below the 10% threshold, or possibly it is even necessary to brake, and high speeds can still be achieved.

If, on the other hand, the vehicle must climb a grade upwards, the engine speed will drop and the driver will attempt by shifting into a lower gear to stabilize the speed of the vehicle and to obtain the operating condition "slightly drawing." From the operating condition $n_1$, $-b$, $s_2$ through $n_1$, $-b$, $s_3$ the operating condition $n_1$, $\pm b_0$, $s_3$ can initially occur whereby a stabilization would already have been obtained, or an operating condition will occur which corresponds to the condition $n_2$, $-b$, $s_2$. If it is possible in this case to cancel the deceleration by depressing the gas pedal ($n_2$, $-b$, $s_3$), the operating condition $n_2$, $\pm b_0$, $s_3$ will be reached. This operating condition is absolutely required for climbing the gradient in this case and, therefore, must be evaluated "good". If, on the other hand, the deceleration which has occurred cannot be reduced by depressing the gas pedal further, it may be required to shift into an even lower gear, so that a uniform speed is possibly achievable only in the condition $n_3$, $+b_0$, $s_1$.

If the speed of the engine rises starting from the operating conditions $n_2$, $\pm b_0$, $s_3$ when the gradient has been climbed and the vehicle travels on a less steep stretch, the driver will be signalled upon reaching the $n_2/n_3$ threshold value if he did not shift at the right time, that he should shift into a higher gear in order to drive economically. In the other case, i.e. the operating condition $n_3$, $\pm b_0$, $s_1$, the driver will want to reach a higher speed after climbing the gradient and will express this intention by depressing the gas pedal. Accordingly, this results also in an operating condition $s_3$, $\pm b_0$, $s_2$ or $n_3$, so that a signal for shifting into a higher gear will be triggered.

It shall be added that the evaluation to be made shall also give the indication "good" or "conditionally satisfactory" for trips on superhighways with relatively high recommended speeds and that it is not absolutely necessary to drive in the speed range $n_3$, but that it is of course possible to drive in the highest gear, for example, the condition $n_2$, $\pm b_0$, $s_3$ for maintaining this recommended speed. This means that, for reaching this speed, it might certainly be necessary to enter for a short time the speed range $n_3$ which is not optimal. In this case, an operating condition of, for example, $n_3$, $\pm b$, $s_3$ could occur, the evaluation of which is given as "poor" in FIG. 1. However, the evaluation can be given as "conditionally satisfactory" because it should be reached more or less during every overtaking maneuver just for safety's sake.

It shall be added that the signals and commands to be given must, of course, appear at a suitable location on the dashboard within the field of vision of the driver, and that, additionally, it must be possible to transmit the signal and commands to the tachograph in the vehicle, so that they are recorded, for example, in the form of diagrams with bars of different widths, and, thus, to make them available for a later evaluation.

The embodiment illustrated in FIG. 2, in the form of a block diagram shows a pick-up 1 which generates pulses which are dependent on the engine speed and enter a counter 3 through the line 2. Simultaneously, pulses generated in dependence on distance by a pick-up 4 are fed into a counter 6 through a line 5. The basis of the measurement is determined by a clock which is formed in a manner known per se, the clock signals being applied through a line 7 to the counter 3 and the counter 6, and being preferably predetermined at 1 second. The speed value of the engine determined in this manner after 1 second has elapsed is applied through the line 8 at the input of a comparator 9 to which, as is illustrated symbolically, there are assigned internal or external coding switches by means of which those speed threshold values specific for the vehicle can be fixed which mark the speed ranges $n_1$, $n_2$ and $n_3$. The output of the comparator 9 and, thus, the signal formed in the comparator 9 characterizing the operating factor range of the measured speed, are connected to a matrix 13 through lines 10, 11 and 12. Additional lines 14, 15 and 16 connect the matrix 13 to the output of a second comparator 17 which generates signals which characterize the operating factor ranges of the respectively determined acceleration values. For determining the respective acceleration in the acceleration measuring circuit denoted by 34, again with the aid of the clock as a basis of measurement, a speed value is formed in the counter 6 which value is transferred through the line 18 to a subtraction circuit 19, at which there is simultaneously applied through a line 21 the speed value of the preceding measuring cycle which had been retained in storage at 20. After the subtraction of the two speed values has been performed, the new acceleration value is applied at the input of the comparator 17 and is compared to a coding switch field which is externally or internally assigned to the comparator and in which the acceleration threshold values are programmed specifically for the vehicle. Simultaneously, the new speed value is read into the storage through the line 22.

Signals characterizing the respective positions of the gas pedal are also fed to the matrix 13 through the lines 23, 24 and 25. A corresponding position pick-up is symbolized by 26. The three operating factors "engine speed," "acceleration" and "gas pedal position" are linked or encoded in such a way that one is combined with all the others. This encoding provides an operating condition factor at the output of the matrix 13, which is applied through line 27 to a logical OR circuit 28 which has been constructed in accordance with the predetermined evaluation pattern for the operating conditions resulting in the matrix 13. In this manner, the operating condition factor which has been formed controls a signal transmitter 29. The latter can be constructed in such a way that it switches to different display conditions, or it can be composed of separate display elements which can be controlled independently from one another through the lines 30, 31 and 32. Of course, the signal transmitter may also comprise means for an acoustical signalling; this may be advantageous for especially critical operating conditions.

It is obvious that the processing of the operating factors which are selected and delivered by the pick-ups need not be performed exclusively by digital technology, but may also incorporate analog technology. Furthermore, when a microprocessor is used, digital technology with coded data preparation and data transmission is possible. In principle, such a processing of the operating factors could be performed in accordance with the flow chart illustrated in FIG. 3, wherein the line block 33 shown in FIG. 2 indicates the functional perimeter of the microprocessor.

At each new start of the engine, the coding switches representing the threshold values of the operating factors "acceleration" and "engine speed" are selected individually and are stored in different registers as process step A, while, as processing step B, a transfer of fixed values for the coarse adjustment of the respectively determined speed value into additional registers takes place. The following process step C provides for the reading-in of speed and engine speed pulses, after the registers provided for this purpose have been erased. This procedure shall be fixed, for example, at 1 second. Into the further processing flow there is inserted a stoppage recognition D which, if positive, prevents a display, and, if negative, prepares the charging of a register which serves for the formation of operating condition factors in the form of suitable code words. In the following process step E, the read-in engine speed value is set off against the stored engine speed threshold values and a code word element is formed which is fed into the code word register. As the next process step F, the gas pedal position is read in, again a code word is formed and is OR'd in the code word register with the code word element already in the code word register. In the same manner, in the process step G, the acceleration is computed from the stored old speed value and the determined new speed value and, by comparison with the stored acceleration threshold values, another code word element is determined which is also OR'd, as the last element of the desired code word, with the content of the code word register. After the new speed value has been stored in the respective register in the processing step H, a processing of the code word with the content of a program storage fixed in accordance with the evaluation is effected in the arithmetic unit of the microprocessor 33 in the next process step J, and a signal corresponding to the code word is emitted. In addition, a signal for releasing or restarting the next following processing cycle is given.

It shall be added that not only recording means can be triggered through the signals, but that, for example, also counters can be provided and actuated and, thus, a summing up over time of the respectively picked-up operating conditions and their evaluation with respect to the driving manner is facilitated.

What is claimed is:

1. An arrangement for obtaining an indication concerning the economy of operation of a motor vehicle, comprising a plurality of sensors for detecting different vehicle operating factors, including at least a first sensor for detecting engine speed, a second sensor for detecting distances travelled by the vehicle, and a third sensor for detecting the position of the engine throttle; means associated with each of said sensors for transmitting information corresponding to the operating factors detected by said sensors, said transmitting means including an acceleration measuring device coupled to said second sensor for determining the acceleration of the vehicle; means coupled to said transmitting means for forming operating condition values corresponding to the information provided by said transmitting means, said forming means including a first comparator which includes means for selectively fixing a first set of threshold values to provide first output signals in accordance with the engine speed detected by said first sensor, wherein said first output signals each correspond to a certain speed range determined by said first set of threshold values, a second comparator including means for selectively fixing a second set of threshold values to provide second output signals in accordance with the acceleration of the vehicle determined by said acceleration device so that said second output signals each correspond to an acceleration range determined by said second set of threshold values wherein said acceleration range is selected at least from among a set of ranges including $-b<a<+b, a>b$ and a $<-b$ wherein a is the vehicle acceleration and b is a certain positive value; combining means coupled to said forming means for combining and evaluating the operation condition values in accordance with a predetermined evaluation pattern wherein the combined operating condition values are rated, said combining means including a matrix for encoding said first and said second sets of output signals and the output of said third sensor into a combined code word and means for according one of a number of ratings to different groups of combined code words; and at least one signal transmitter for providing a number of signalling conditions each of which corresponds to a different group of equally rated combined code words.

2. An arrangement according to claim 1, including a microprocessor coupled to said first, said second and said third sensors for processing the vehicle operating factors detected by said sensors so that a first code word element representing a certain engine speed range is formed for each detected value of engine speed, a second code word element representing a certain acceleration range is formed for each detected value of vehicle acceleration, and a third code word element is formed which represents a certain position range of the engine throttle, said microprocessor including a working storage, means for combining said first, said second and said third code word elements into said working storage to form said combined code word, a program storage including an evaluation program, means for processing said combined code word according to the evaluation program and providing an evaluation result, and an arithmetic unit for providing a signal corresponding to the evaluation result.

3. An arrangement according to claim 1, comprising a number of said signal transmitters each including an indicating light of a different color.

4. An arrangement according to claim 1, wherein said signal transmitter is arranged to provide a verbal command.

5. An arrangement according to claim 1 comprising recording means including a tachograph which is arranged to operate simultaneously with said signal transmitter.

* * * * *